Nov. 29, 1938.  V. A. ROHLIN  2,138,354
APPARATUS FOR HEATING AND DEAERATING WATER
Filed Aug. 19, 1936  2 Sheets-Sheet 2
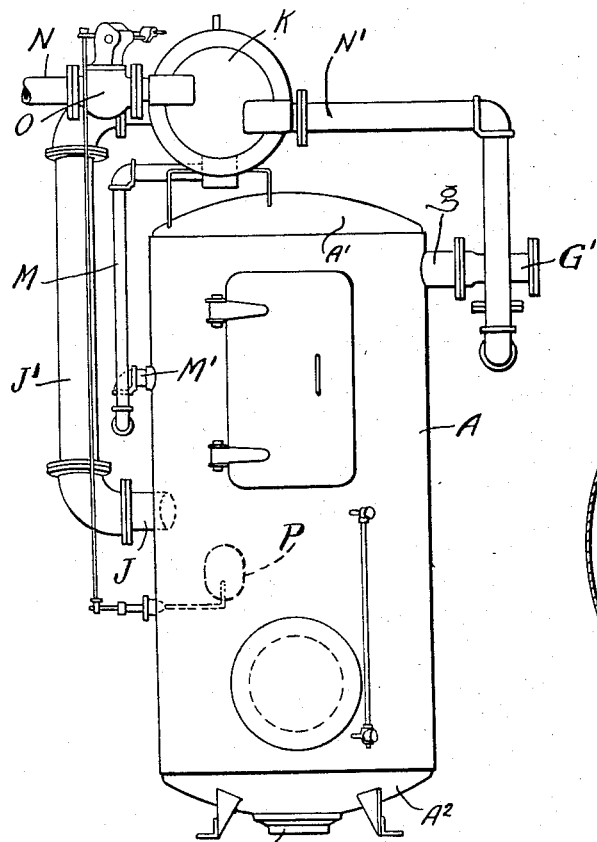
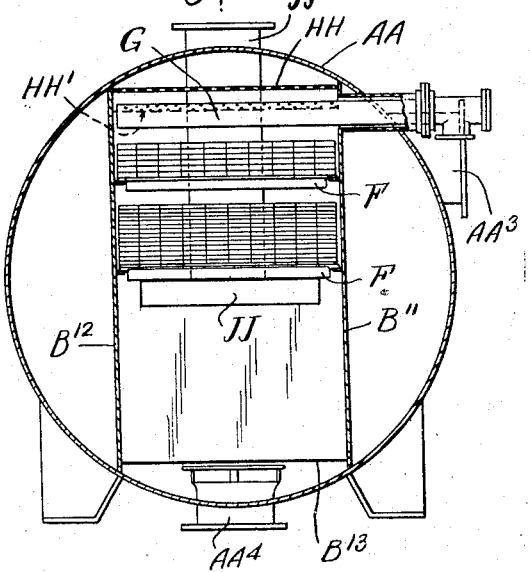
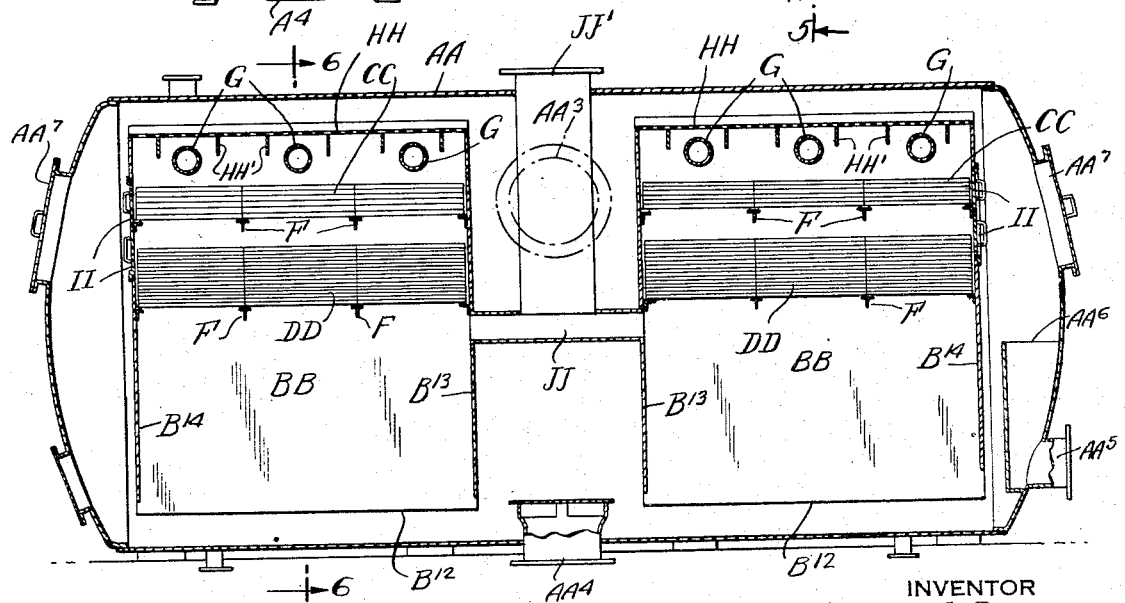
INVENTOR
VICTOR A. ROHLIN
BY
John E. Hubbell
ATTORNEY Patented Nov. 29, 1938

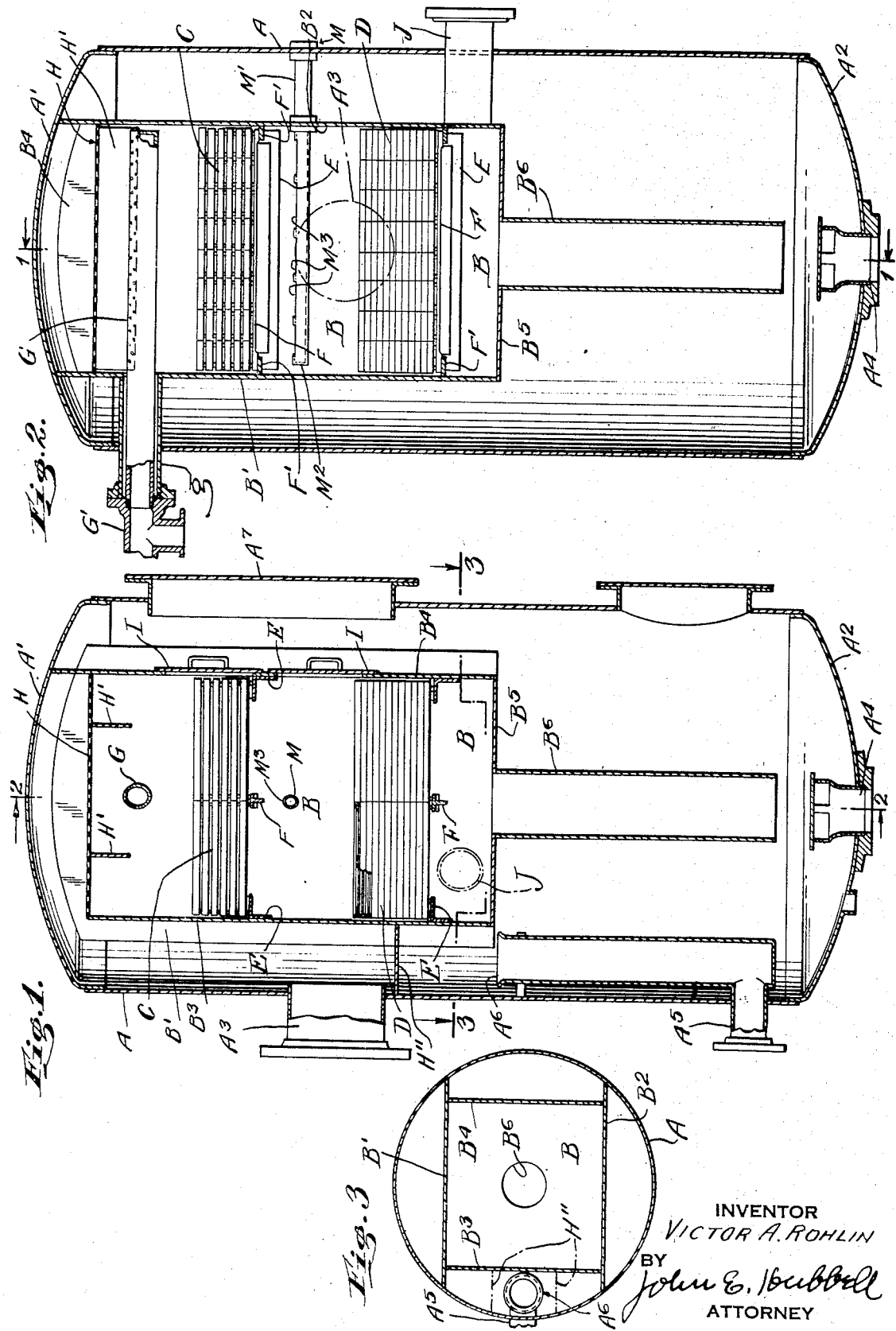

2,138,354

UNITED STATES PATENT OFFICE 2,138,354

APPARATUS FOR HEATING AND DEAERATING WATER

Victor A. Rohlin, Philadelphia, Pa., assignor to Cochrane Corporation, Philadelphia, Pa., a corporation of Pennsylvania Application August 19, 1936, Serial No. 96,747

4 Claims. (Cl. 183—2.5)

The general object of the present invention is to provide improved apparatus for heating and deaerating water to be used for boiler feed and other purposes, in which it is desirable that the water used should be practically air free. More specifically, the object of the present invention is to avoid or minimize tank wall deterioration by the corrosive action of the air liberated in water heating and deaerating apparatus of the type now in extensive use, in which water is heated and deaerated within a metal walled enclosure which may be called a tank, and ordinarily is a steel tank, by bringing the water treated, and the steam for treating it, into intimate contact within the tank, to which the air and steam are separately introduced, and from which the treated water and a gas and vapor mixture, including the liberated air and uncondensed steam, are separately withdrawn.

While various arrangements and forms of means for bringing the air and steam into intimate contact and for the removal of the liberated air, have been used and proposed for use in apparatus of the type specified, in every form of such apparatus heretofore known, so far as I am aware, the tank wall or shell is internally exposed to the corrosive action of the liberated gases. The resultant tank deterioration is of practical importance because the cost of the tank constitutes a major item of the total installation cost of a water heating and deaerating unit, and a relatively long effective tank life is therefore of major importance from the economical standpoint. The cost of the tank of such a unit is considerable, not only because of the tank bulk, but also because the tank must be constructed to withstand a considerable difference between the pressure within the tank and the external atmospheric pressure, even though the pressure within the tank may differ only a pound or two from the atmospheric pressure in normal operation, as may or may not be the case. Furthermore, the tank must have the mechanical strength to support, and resist deformation under, the weight of various adjuncts, customarily included in a deaerating unit, such as one or more external vent condensers and control valves, as well as the weight pipe connections to the tank, necessary in all cases.

The corrosive action to which the inner surface of the tank wall is subjected, when exposed to contact with the liberated air, is severe, as is indicated by the fact that the principal commercial use of such apparatus, is to eliminate air from boiler feed water, so as to thereby protect the boilers in which the water is used, and the economizers, feed lines, etc., through which water is passed to the boilers, from the corrosive action of oxygen liberated when air, dissolved in the water when cold, is separated from the water when the latter is heated.

The general object of my present invention is attained, and that invention is broadly characterized by the provision of means within the deaerating tank to form a deaerating chamber having walls separate from the tank wall and including a steam space in which the water heating and deaerating action is wholly or mainly effected, and from which, the liberated air in admixture with uncondensed steam, is withdrawn without coming into contact with the tank wall. Preferably, the steam space within the deaerating chamber is in substantially free communication with the tank space exterior to the compartment, so that there is no significant difference between the pressures acting on the inner and outer walls of the compartment. In consequence, the effective life of the compartment wall does not terminate, as does the effective life of the tank wall in apparatus of the type heretofore used, when the corrosive action of the liberated air on the wall so weakens the latter that it could not withstand any significant difference between the pressures acting on the inner and outer sides of the wall. With all forms of the improved apparatus, it will ordinarily be practically feasible to replace the compartment walls at an expense relatively small in comparison with the cost of replacing the tank shell, but without such replacement, the effective life of a deaerating unit constructed in accordance with the present invention, will ordinarily be substantially greater than that of a unit constructed in accordance with prior practice.

The principle of the present invention and its advantages may be utilized and obtained with apparatus of various forms, and, in particular, with apparatus in which the water distribution means, including the shape and disposition of water spreading trays or baffles employed to effect the necessary intimate contact of the steam and water, take various forms including those now in general use, and most highly approved from the practical standpoint.

In the more desirable forms of the invention, the steam space of the deaerating compartment communicates with the external tank space through an opening in the compartment wall through which the steam used passes into the steam space, from the external tank space into which the steam is initially introduced. In such forms of the invention, the inflow of steam into the compartment through the communication opening is effective to prevent the outflow of air liberated in the compartment through said opening, even though the opening be formed in a vertical wall of the compartment. However, because of the character of the distributing baffle or tray arrangement, which I prefer to employ in the steam space of the compartment, and for practical construction reasons, I prefer to pass the steam from the external tank space into the steam space of the deaerating compartment, through a perforated plate forming what may be regarded as a pervious top wall for the deaerating compartment. In preferred forms of the invention also, the vertical walls of the compartment are impervious, except for a lateral opening for the connection to the steam space of the compartment of a pipe or pipes leading from the compartment to the exterior of the tank. In practically preferred forms of the invention also, the deaerating compartment has a lower outlet for the passage of deaerated water into the external tank space, and said outlet is water sealed by the water in the lower portion of the tank, which, as is customary, forms a water storage space from which water is withdrawn as required for boiler feed and other purposes.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a vertical section on the line 1—1 of Fig. 2, of a deaerator tank structure;

Fig. 2 is a section on the line 2—2 of Fig. 1;

Fig. 3 is a horizontal section taken on the line 3—3 of Fig. 1;

Fig. 4 is a somewhat diagrammatic elevation of deaerating apparatus including the tank structure shown in Figs. 1, 2, and 3;

Fig. 5 is a vertical section on the line 5—5 of Fig. 6, of a deaerating tank structure, differing in form from that shown in Figs. 1–4;

Fig. 6 is a section on the line 6—6 of Fig. 5.

The deaerating apparatus shown in Figs. 1–4 comprises a vertically disposed cylindrical metal tank with convex upper and lower ends $A'$ and $A^2$, and provided with a lateral inlet $A^3$ for heating and deaerating steam, and a bottom outlet $A^4$ for the discharge of heated and deaerated water, which may pass to a boiler feed pump or be otherwise utilized. Ordinarily, the tank is provided with an overflow connection $A^5$ which, as shown, comprises a vertical standpipe portion within the tank, having an open upper end $A^6$, the level of which fixes the maximum height of water level in the water storage space formed by the lower portion of the tank A.

The deaerating chamber B within the tank A, provided in accordance with the present invention, ordinarily and as shown, is rectangular in horizontal cross section. As shown in Figs. 1–3, the chamber B has its vertical walls formed by a pair of parallel spaced apart metal plates $B'$ and $B^2$, and by a second pair of parallel spaced apart plates $B^3$ and $B^4$, which extend transversely to the plates $B'$ and $B^2$. The top edges of the plates $B'$ and $B^2$ extend into engagement with the tank end section $A'$, and the vertical edges of those plates extend into engagement with the cylindrical tank body. The plates $B^3$ and $B^4$ extend between, and advantageously have their vertical edges welded to the plates $B'$ and $B^2$. The plate $B^3$, which is directly in front of the steam inlet $A^3$, has its upper edge spaced away from the upper tank end $A'$, to provide a port for the flow of steam into the upper end of the space B. The upper edge of the parallel plate $B^4$ is shown as extending into engagement with the upper tank end $A'$. The tray chamber B has a bottom wall $B^5$ located above the maximum water level in the tank storage space, and formed by a steel plate which may be welded at its edges to the plates $B'$, $B^2$, $B^3$, and $B^4$. The bottom plate supports a depending tubular member $B^6$ which may be formed by a steel pipe welded at its upper end to the plate $B^5$, and having its lower end above the bottom tank end $A^2$, but well below the normal water level within the tank storage space. The water outlet from the compartment B formed by the member $B^6$, is thus water sealed.

The deaerating chamber is supported by the tank A through some suitable connection. In the arrangement shown, the supporting connection is formed by welding the plates $B'$ and $B^2$ to the tank structure, either along the lines at which the upper edges of the plates engage the upper tank end $A'$, or along the lines of engagement of the vertical edges of the plates with the tank body, or along both sets of said lines. The upper edge of the plate $B^4$ may also be welded to the upper tank end $A'$.

Within the space B are water spreading trays or baffles, comprising an upper bank of trays C and a lower bank of trays D advantageously arranged to provide a greater aggregate area for the down flow of steam through the trays in the upper bank than through the trays in the lower bank. In the respect just noted, as well as in the form and relative disposition of the trays, and in respect to the fact that the steam, as well as the water, passes downwardly through the trays, the construction shown may follow the efficient practice, which is illustrated and described in the Gibson and Rohlin Patent No. 1,951,015, and is now in extensive use. As shown, the trays, which are in the form of shallow troughs with perforated bottoms, are arranged in each bank to extend transversely to the plates $B^3$ and $B^4$. Each bank of trays is supported by angle bar parts E welded to the plates $B^3$ and $B^4$, and by one or more intermediate beams F parallel to the angle bars and supported at its ends by supporting parts $F'$ carried by the plates $B^1$ and $B^2$. As shown in Fig. 1, there is a single intermediate beam F beneath each tray bank, but in the construction shown in Fig. 5, there are two intermediate beams F beneath each tray bank.

The water to be heated and deaerated is introduced into the upper end of the compartment B by suitable water distributing means which advantageously consists of one or more horizontally disposed distributing pipes G, one such pipe being shown in Fig. 1, while three such pipes are provided above each bank of trays CC in the construction shown in Figs. 5 and 6. Each pipe G extends through the plate $B'$, and through the tank body or shell, and externally of the latter is connected to the source of water to be heated and deaerated. The other end of each pipe G terminates just short of the plate B², and is closed. Each pipe G discharges water in a multiplicity of upwardly directed streams, through a corresponding multiplicity of discharge perforations formed in the upper portion of the tube wall. The water discharged is prevented from passing into the contact with the upper tank end A' by a perforated or screen plate H, which extends across the upper end of the compartment B and, in effect, forms a pervious top wall for the compartment. The plate H also serves to divide the steam passing from the inlet A³ over the upper edge of the plate B³, and thence into the upper end of the chamber B, into a multiplicity of fine streams passing downward with considerable velocity into the upper end of the space B. The said steam streams are distributed across the entire horizontal cross section of the said space. As shown, vertical baffles H' secured to, and depending from the screen plate H, one at each side of the distribution pipe G, restrict the movement of the water discharged by said pipe toward the side wall plates B³ and B⁴ of the deaerating compartment.

To permit inspection, cleaning, and repairs or replacements of the trays, the wall B⁴ is formed with an aperture at the end of each tray bank, each such aperture being normally closed by a closure member I bolted or otherwise detachably secured to the plate B⁴ so as to form a tight closure for the aperture. At the side of the tank A adjacent the apertures normally closed by the closure members I, the tank A is provided with a removable door A⁷. When the door A⁷ and the closure members I are removed, access to the trays C and D is permitted, and the trays may be removed and replaced, if necessary.

The air liberated from the water and steam not condensed in the water heating and deaerating operation, is withdrawn through a horizontal vent outlet pipe J, extending through the cylindrical body of the tank A and into connection with the plate B², and opening through the latter into the portion of the chamber B between the lower bank of trays D and the bottom plate B⁵.

The tank A and the walls of the space B may, and ordinarily will be made of steel plates. The trays C and D are ordinarily made of cast iron and some of the tank fittings may also be made of cast iron. Preferably, however, parts exposed to the most corrosive action of the air liberated from the water, such as the baffles H', and the water distributing pipe or pipes G, are advantageously made of some material, as copper or brass, more immune than steel or cast iron to the corrosive action of the liberated air. To facilitate the replacement of the distributor pipe G, the latter may be detachably connected at its outer end to a fitting part G' which is detachably connected to a tubular part g. The latter may be a steel pipe section extending through the wall of the tank A into engagement with the plate B' to which it is welded or otherwise secured. With the described arrangement, on the removal of the fitting part G', the water distributor pipe G may be replaced without opening any joint in the wall of the space B, or in the tank shell.

As those skilled in the art will understand, a complete deaerator unit, whether or not it includes the special features shown in Figs. 1-3, must ordinarily include tank adjuncts, such as those shown in Fig. 4, wherein the pipe J is connected externally of the tank A by a pipe J' to the inlet of a vent condenser K mounted on the top of the tank and of the surface condenser type. Water of condensation is returned from the condenser K to the space B by a water sealed drain connection M. The latter discharges through a horizontal discharge pipe section M' extending through the wall of the tank A and plate B² and almost entirely across the compartment B, between the trays C and D. The end M² of the pipe section M' adjacent the plate B' is closed, but the portion of the pipe section M' within the compartment B, is formed with longitudinally distributed outlets M³ at its upper side. If the pressure within the deaerating tank is sub-atmospheric, as may sometimes be the case, an air pump or other vacuum creating device must be employed to pull the air steam mixture out of the compartment B through the pipe J, but no such device is shown in Fig. 4.

The condenser K, is cooled by, and thereby preheats the water to be deaerated, the water treated passing from the supply pipe N to the water inlet of the condenser K, and passing from the water outlet of the condenser through a pipe N' to the connection G' through which the water passes into the deaerating chamber through the distributor or distributors G. A valve O in the supply pipe N is controlled by a float P rising and falling with the water level in the water storage portion of the tank so as to normally maintain that water level substantially above the lower end of the discharge pipe B⁶, and somewhat below the level at which water can pass into the open upper end A⁶ of the overflow connection. In addition to the parts above mentioned, the tank A is usually provided with a water level gauge, manholes, and blow-off and pressure relief connections which do not need to be further referred to herein. While the adjuncts shown in Fig. 4, and not shown in Figs. 1, 2, and 3, form no part of the present invention, the fact that the structure must support or have connected to it such adjuncts, adds to the practical value of the protection to the tank shell, and the increase in the life of the latter obtained by the use of the present invention.

As will be apparent to those skilled in the art, in normal operation of the apparatus shown in Figs. 1-4, water is passed into the deaerating chamber B through the distributor pipe G at the rate required to maintain an approximately constant volume of water in the reservoir space formed by the lower portion of the tank A, notwithstanding variations in the rate at which water is withdrawn for use through the service outlet A⁴. The pressure in the steam space within the compartment B, will be approximately the same as the steam pressure at the tank inlet A³, since the reduction in pressure required for the movement of the steam from the tank inlet through the perforations in the screen plate H, is relatively minute. In normal operation, the major portion of the steam entering the tank is condensed as the steam passes downward through the upper bank of trays C, and the amount of steam condensed varying directly with the amount and inversely with the temperature, of the water introduced through the distributor pipe G. In respect to its water heating and deaerating characteristics, the apparatus shown in Figs. 1-4 does not differ significantly from apparatus of a type and form now in extensive and highly successful use, but subject to tank deterioration, due to the corrosive action of liberated air which is avoided by the use of the present invention.

The form of apparatus constructed in accordance with, and utilizing the principles of the present invention, may differ widely from that shown in Figs. 1-4. One example of such a modification in form better adapted for use in large capacity units than the construction first described, is illustrated in Figs. 5 and 6. In the construction shown in Figs. 5 and 6, the tank body or shell AA is cylindrical and provided with convex ends, but is horizontally disposed, and is elongated to receive two spaced apart heating and deaerating chambers BB, each of which is similar in its operating characteristics and generally analogous in its construction to the chamber B of the construction first described.

As shown, an opposing pair of walls $B^{11}$ and $B^{12}$ for each compartment BB, are formed by vertical plates having their upper and lower edges in engagement with the tank shell and preferably welded to the latter. The other two walls $B^{13}$ and $B^{14}$ of each space BB, extend between, and are welded at their vertical edges to the corresponding plates $B^{11}$ and $B^{12}$. The plates $B^{13}$ and $B^{14}$ are spaced away from the tank AA at top and bottom, but the lower edges are located well below the normal water level in the tank AA, so that the lower end of the space BB is separated from the exterior tank space by a water seal.

The upper and lower trays CC and DD in each compartment BB may be similar in construction, disposition, and supporting provisions to the construction first described, except that, as already noted, beneath each bank of trays there are two intermediate supporting beams F instead of one, only, as in the construction first described. The wall $B^{14}$ of each compartment BB adjacent the corresponding end of the structure, is formed with openings for tray removal and replacement normally closed by closure members II adjacent a tray door $AA^7$ formed in the corresponding end wall of the tank shell. As shown, in the upper portion of each compartment BB there are three water distributors G, each of which may be similar to the single distributor G shown in the construction first described. All of the distributors G shown in Fig. 5 may receive water from the water outlet of a vent condenser, or some of them may receive water from the vent condenser, while one or two distributors in each pipe may receive water from another source, and in particular, may receive "hot returns" from the discharge traps of high pressure steam lines.

The steam inlet $AA^3$ opens through the tank shell AA directly into the space between the spaced apart plates $B^{13}$ of the two chambers BB. As shown, the service water outlet $AA^4$ from the tank AA, opens from the bottom of the space between the plates $B^{13}$. The two compartments BB are connected above the water level and below the lower trays D, by a horizontal conduit JJ, shown as rectangular in cross section. A vertical pipe JJ' is connected at its lower end into the top wall of the conduit JJ, and extends upwardly to and through the top of the tank shell, and in conjunction with the conduit JJ, provides a vent for the discharge of air and uncondensed steam. The pipe JJ' may lead to a vent condenser (not shown) as does the pipe J of the construction first described. The screen plate HH at the top of each compartment BB, is provided with depending flanges or webs HH' at opposite sides of each corresponding distributor G, and serve the same purpose as the baffles H' first described. The tank AA is provided at one end with an overflow connection $AA^5$ preventing the water level in the tank from rising significantly above its upper end $AA^6$, the latter being below the lowermost trays DD in the compartments, and below the conduit JJ.

The construction shown in Figs. 5 and 6 includes nothing corresponding to the bottom wall plate $B^5$ and separate water outlet pipe $B^6$ of the construction first described, and a significant portion of the water storage space of the tank AA is formed by the lower portions of the compartments BB, but neither in these respects nor in respect to other differences in form does the construction shown in Figs. 5 and 6 differ significantly in operation, or for the purposes of the present invention from the construction first described.

While in accordance with the provisions of the statutes, I have illustrated and described the best forms of my invention now known to me, it will be apparent to those skilled in the art that changes may be made in the form of the apparatus disclosed without department from the spirit of my invention as set forth in the appended claims and that in some cases certain features of my invention may be used to advantage without a corresponding use of other features.

Having now described my invention, what I claim as new and desire to secure by Letters Patent, is:

1. In deaerating apparatus, the combination with a tank adapted to withstand a substantial internal steam pressure, of means providing a deaerating compartment within said tank having walls separate from the wall of said tank and including a steam space in free communication with the tank space external to said compartment, means for introducing water and steam into and effecting their intimate contact within said steam space, means for passing water out of the lower portion of said compartment, and means including a conduit communicating with said compartment and extending therefrom through the wall of said tank for passing air separated from the water in said compartment to the exterior of said tank, without coming into contact with the inner wall of the tank.

2. In deaerating apparatus, the combination with a tank adapted to withstand a substantial internal steam pressure, the lower portion of which normally contains water, of means providing a deaerating compartment within said tank having side and top walls separated from the side and top walls of the tank by a compartment enveloping space, said compartment including a steam space in free communication with the said enveloping space external to said compartment at a level above the level of the water normally contained in the tank, and said compartment having a lower water outlet to said tank space adapted to be water sealed by the water normally contained in the tank, means for introducing water and steam into, and for bringing the water and steam into intimate contact within, said compartment, and means for passing air separated from the water in said compartment to the exterior of said tank, without coming into contact with the inner wall of the tank.

3. In deaerating apparatus, the combination with a tank adapted to withstand a substantial internal steam pressure, the lower portion of which normally contains water, of means providing a deaerating compartment within said tank having side and top walls spaced from the side and top walls of the tank thereby providing a steam space above said water, surrounding and extending over the top of said compartment, said compartment including a steam space in free communication with the tank space external to said compartment at a level above the level of the water normally contained in the tank, said compartment having a lower water outlet to said tank space adapted to be water sealed by the water normally contained in the tank, means for supplying steam into said tank space, means for passing water into said steam space and into intimate contact with the steam within said space, and means for passing air separated from the water in said compartment to the exterior of said tank without coming into contact with the inner wall of the tank, and means for withdrawing water from the lower portion of the tank.

4. A deaerating heater structure having an outer shell adapted to resist steam pressure and an inner shell separated from the outer shell by a lower water space and an upper steam space and enclosing a chamber within which gases are liberated from the water treated and which communicates at an upper level with said steam space, and communicates with said water space at a level below the top of the latter, means for supplying steam to said steam space, means for passing water to be treated into said chamber and into intimate contact therein with steam entering said chamber from said steam space, means for withdrawing deaerated water from said water space and a conduit extending through the outer shell into communication with said chamber for withdrawing liberated gases from said chamber whereby the inner shell is entirely surrounded in part by uncontaminated steam and in part by deaerated water, and whereby the outer pressure shell is preserved from contact with the corrosive gases.

VICTOR A. ROHLIN.